Dec. 24, 1968 R. F. DYER ET AL 3,417,552

FILTER ELEMENT MADE OF POLYMERIC FILM

Filed Jan. 6, 1967 2 Sheets-Sheet 1

Richard F. Dyer
John M. Wininger, Jr.
INVENTORS

BY William T. French
George P. Chandler
ATTORNEYS

Dec. 24, 1968 R. F. DYER ET AL 3,417,552
FILTER ELEMENT MADE OF POLYMERIC FILM
Filed Jan. 6, 1967 2 Sheets-Sheet 2

HAIR-LIKE PROTRUSIONS  FRACTURED FILM

BONDS AT INTERSECTIONS OF FRACTURED FILM

HAIR-LIKE PROTRUSIONS

Richard F. Dyer
John M. Wininger, Jr.
INVENTORS

BY William T. French
George P. Chandler
ATTORNEYS

United States Patent Office 3,417,552
Patented Dec. 24, 1968

3,417,552
FILTER ELEMENT MADE OF POLYMERIC FILM
Richard F. Dyer and John M. Wininger, Jr., Kingsport, Tenn., assignors to Eastman Kodak Company, Rochester, N.Y., a corporation of New Jersey
Continuation-in-part of application Ser. No. 446,059, Apr. 6, 1965. This application Jan. 6, 1967, Ser. No. 607,736
10 Claims. (Cl. 55—528)

ABSTRACT OF THE DISCLOSURE

A filter element for removing unwanted particles, vapors and the like from a flowing gas, composed of a plurality of intermingled, flat ribbons having numerous very small fibrils attached to and extending outward from the surface thereof. The ribbons of the filter element are produced by orienting a polymeric film to a high degree and subjecting it to the beating action of a flow of a gas, such as air, under high pressure. The beating action of the air jet fractures the film into the ribbon and, because of the high degree of orientation of the film, causes the fibrils to be formed.

---

This application is a continuation-in-part of application Ser. No. 446,059, filed Apr. 6, 1965 now U.S. Patent 3,336,174, issued Aug. 15, 1967.

This invention is directed generally to a filter formed of a plurality of intermingled fibers which form a tortuous path for a flowing gas so that any particles or vapors entrained in the gas will have the opportunity to contact several of the fibers and become adhered thereto. In particular, this invention is directed to a fibrous filter element which is utilized to remove tar and nicotine contained in smoke from a burning cigarette.

The use of very small fibers in forming filter elements has been known for some time. For example, fiberglass formed into battings has found widespread acceptance in many filter applications such as air conditioning. In the very difficult task of removing tar and nicotine from tobacco smoke, it has been known to utilize cellulose acetate fibers formed into compacted filter plugs. In these prior applications of fibers it has been shown that the efficiency of removal of particulate matter is related to the fineness of the fiber used to make the filtering element. Thus, it is known that tobacco smoke filter plugs formed from fine denier per filament tow, 1.6 denier per filament for example, are considerably more effective in removing particulate matter such as tar from the smoke stream than a filter of the same size and type made from 5 denier per filament material. This relationship between fineness of filament and efficiency in smoke removal is probably due to the fact that fine filaments can be compacted into a fairly dense mass having very fine, tortuous passageways therethrough.

Using fine denier per filament fibers in filters does, however, present several problems. For example, such filters are hard to fabricate due to the weak nature of the small filaments which break easily in the processing steps. Moreover, because the high efficiency is the result of very small filter passageways, the pressure drop through the filter is fairly high. This is an especially acute problem when a tobacco smoke filter is considered since a high pressure drop will cause discomfort and dissatisfaction to the smoker.

According to the present invention the disadvantages of a high efficiency filter formed from fine denier filaments is overcome by utilizing flat fibers formed by fracturing a highly oriented polymeric film into ribbons having a plurality of fibrils extending outwardly from the surfaces thereof. The fracturing is accomplished by subjecting the highly oriented film to an air stream causing longitudinal cracks to appear in the film resulting in a plurality of interconnected ribbons. Since the ribbons are generally fairly large their strength is relatively high in relation to that of the fine filaments previously utilized. Because of the fibrils on the ribbon surfaces, tortuous passageways through the filter will be formed when a plurality of such ribbons are formed into a batting or cigarette filter plug. Further, because of the large surface area of these generally flat ribbons, the gas in which undesired particles are entrained has a greatly increased chance to contact a fiber surface, thus, giving the particles the opportunity to be removed.

Accordingly, it is an object of the present invention to provide improved filters having a high efficiency, low cost, and relatively low pressure drop. It is another object of this invention to provide a filter formed of ribbons fractured from a highly oriented film of polymeric material. A still further object of this invention is to provide a filter having high removal efficiency and a low pressure drop. Yet another object of this invention is to provide fibers for a filter which are easily manufactured from a relatively inexpensive material.

These and other objects and advantages of this invention will be more apparent upon reference to the following specification, appended claims, and drawing wherein:

Figure 7:
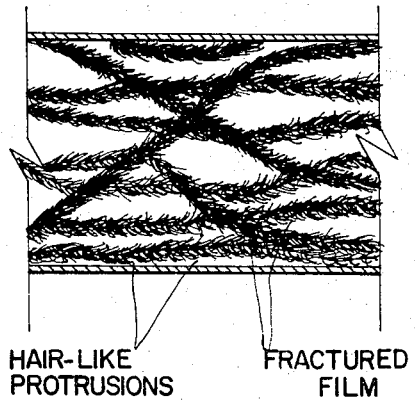
Figure 6:
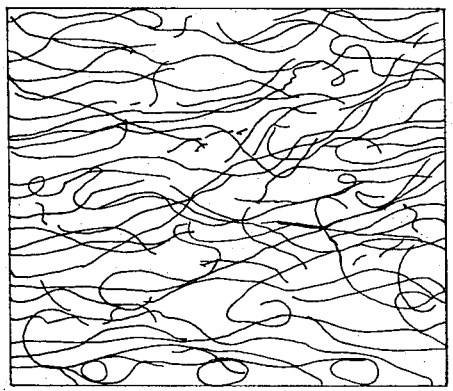
FIGURE 6 is a view depicting a longitudinal section of a film fractured into a mass of ribbons in accordance with the instant invention.
Figure 8:
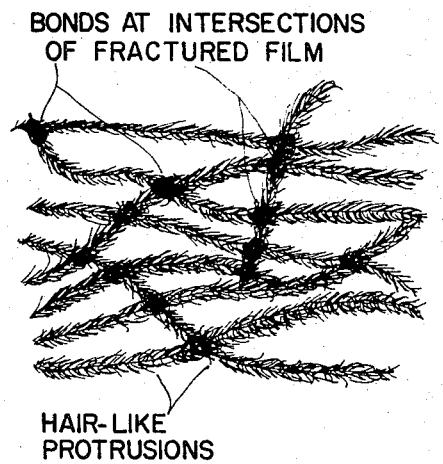

FIGURE 7 is a diagrammatic view of a mass of ribbons produced in accordance with the instant invention compacted into a filter element such as those utilized for removing unwanted components of cigarette smoke; and FIGURE 8 is a diagrammatic view of a non-woven mat or filter made up of ribbons produced in accordance with the instant invention in which the ribbons are bonded together at their intersects according to another embodiment of the invention.

In order to better understand the construction and use of these novel filters, they will be described in relation to their utilization as filters to be placed on the end of cigarettes to remove unwanted components of the cigarette smoke drawn therethrough. It is to be understood, however, that filters fabricated from fractured film in accordance with the invention may be used in many other filtering applications. For example, air filters such as those utilized in air conditioning units and furnaces could be formed of ribbons from fractured film. Industrial type filters for both gases and liquids could be produced in this manner as well as air cleaners to be utilized on internal combustion engine air intakes. Other uses will be readily apparent to those skilled in the art.

Figure 1:
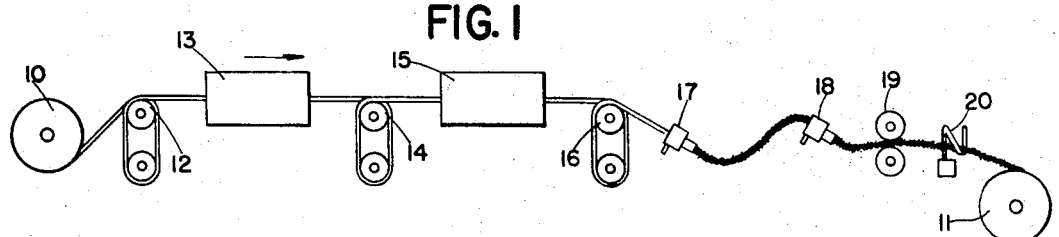
FIGURE 1 is a schematic side elevation view of a system for drafting, heat setting, and disintegrating the oriented film product into flat, partially fractured ribbons of the present invention.

With continued reference to the accompanying figures wherein like numerals designate similar parts throughout the various views, and with initial attention directed to FIGURE 1, reference numerals 10 and 11 identify respectively a supply package and a takeup roll or other desired packaging device. The supply package 10 may comprise a conventional roll or drum of the film to be fractured or other similarly convenient rotatably supply source.

The supply package 10 and take up roll 11 are in series with one or more canted rolls designated 12 about which the film may be wrapped one or more times before passing into a drafting oven 13. This oven 13 may be of any of the usual constructions employed in the film manufacturing industry. It can be heated electrically or with air or any other convenient and controllable source of heat. The film is withdrawn from oven 13 by canted rolls 14 which are generally running at a speed such that the surface velocity of the film emerging from oven 13 is greater than the surface velocity of the film entering oven 13. Thus, between rolls 12 and 14 the film is drafted the desired amount to increase its longitudinal strength while at the same time, as is well known, the transverse strength of the film is decreased. The speed at which rolls 12 and 14 are driven determines the amount of orientation imparted to the film. After leaving rolls 14, the film is fed into oven 15 which is of the same general construction as oven 13, but which, in the particular embodiment illustrated in FIGURE 1 is employed for heat-setting. The heat setting permanently sets the amount of draw imparted to the film between rolls 12 and 14 and through oven 13. This operation will be explained in more detail hereinafter.

The drawn film is removed from heatsetting oven 15 by canted rolls 16 and fed into a large fracturing jet 17. This jet may be of the construction which is shown in detail in FIGURES 3 and 4. The large jet 17 discharges to a smaller jet 18 the construction of which may likewise be that shown in FIGURES 3 and 4, differing only in being of smaller size.

The highly oriented film is subjected in jets 17 and 18 to the beating action of a fluid, such as air, which causes it to fracture along lines running longitudinally of the film. This longitudinal fracturing results from the fact that drafting increases longitudinal strength while decreasing the transverse strength of the film as hereinstated before. Thus, stress on the film will produce longitudinal fracturing before any transverse fracturing will occur.

The flat fractured film from the jet 18 passes into the nip between the pair of pressure rolls 19 and from there through a conventional traverse guide 20. From the guide 20 the fractured film, which is now in the form of an interconnected network of ribbons, is wound onto the takeup roll 11 or other packaging device. If desired, the mass of ribbons emerging from the nip between pressure roll 19 may be fitted to further machinery such as a filter plug maker as shown in FIGURE 2.

Figure 2:
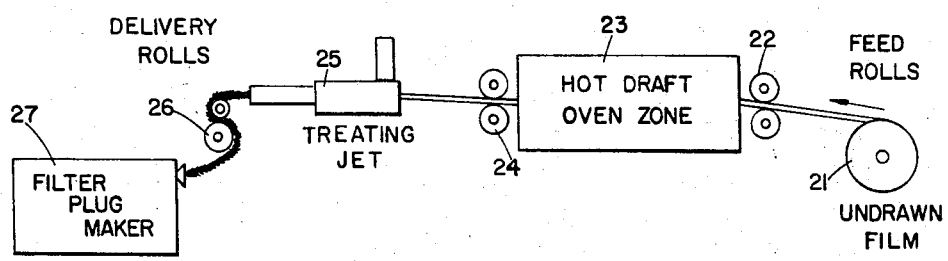
FIGURE 2 is a schematic side elevation view similar to FIGURE 1 but showing an alternate system for drafting and fracturing a film, and for converting the fractured film into filters which are especially useful when made a component part of a cigarette.

In the embodiment illustrated in FIGURE 2, the film supply 21, which may be a roll or drum of film, a film extruder or other convenient source of film to be processed, feeds directly between feed rolls 22 into the drafting oven 23. This drafting oven 23 may be of the same type as that referred to in FIGURE 1. From the drafting oven 23 the film is withdrawn through draft rolls 24 which, similarly to the canted rolls 14, is driven at a velocity such that the surface speed of the film emerging from the drafting oven 23 is greater than the surface speed of the film entering drafting oven 23. The drafted, oriented film is then fractured to the desired degree in treating jet 25 and is delivered by delivery rolls 26 to a cigarette filter plug maker as indicated diagrammatically at 27. From the foregoing it will be observed that the arrangement in FIGURE 2 is generally similar to that of FIGURE 1 except that the several jets in series, the heat-set oven, and canted rolls have been omitted and a cigarette filter plug maker has been added.

While it is not desired to be bound by any theory of operation, it has been found that the draw oven temperature, length of the heated zone, and the draw ratio or ratio of output roll speed to input roll speed should be correlated so that the degree of orientation imparted to the film in the draw zone results in a film strength of at least 3 grams per denier in the longitudinal direction and no more than 0.01 gram per denier in the transverse direction. This ratio of the longitudinal to the transverse strength is termed the fracturability factor and should be in excess of about 300 and preferably in the range of 1,000 or more. Moreover, the fracturability angle which is the angle between the fracture cracks in the film and the longitudinal axis of the film after the jet treatment, should be less than about 5° and preferably less than about 1°. Further, it has been found that the draw ratio that can be imparted to a film is related to the thickness of the film and its polymeric composition. Thus, a 1 mil thick polypropylene film may be drawn about six times its extruded length, whereas a 5 mil thick polypropylene film may be drawn to 12 or more times its extruded length.

Figure 3:
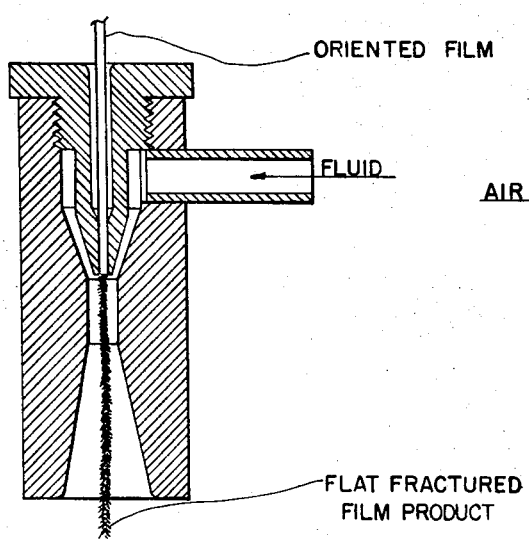
FIGURE 3 is a side elevation in cross section showing one form of jet which we prefer to employ for beating the film to fracture it into ribbons.
Figure 4:
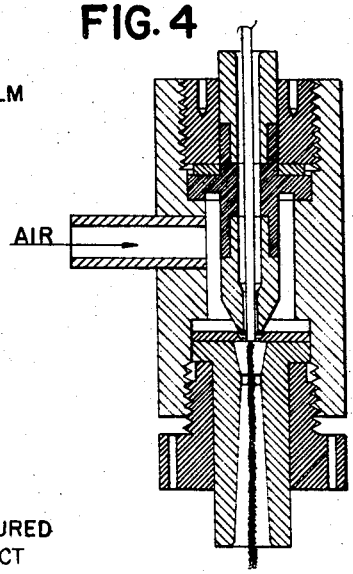
FIGURE 4 is a view similar to FIGURE 3 but showing another form of jet.
Figure 5:
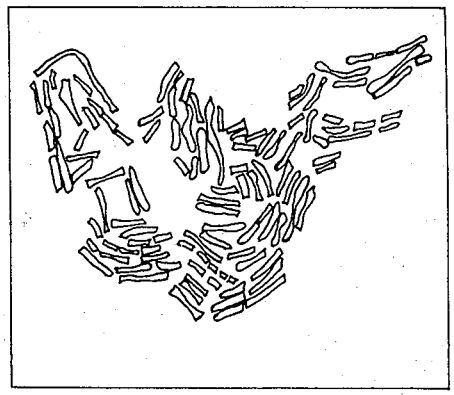
FIGURE 5 is an end view of a film fractured into a mass of interconnected ribbons in accordance with the instant invention.

For any given combination of extruded film thickness, draw ratio, and fracturability factor, the fracturing action of the air jet, such as those shown in FIGURES 3 and 4 may be controlled to achieve a given percentage of the potential amount of fracturing possible. The greater the pressures of the air for a given stream volume the more vigorous the beating of the film resulting in a greater degree of fracturing. The potential fracturability may be determined by calculating the number of filaments which could be produced in a drawn film that would have a width equal to three times their thickness. Thus, a 1 mil thick drawn film three inches wide could be fractured into 1,000 filaments of a 1 mil thick by 3 mil wide rectangular cross section.

It has been found in addition, that the percent of fracturing which occurs is also related to the speed at which the film is passed through the jet. Thus, in general, the slower the speed, the greater the amount of potential fracturing which will occur at a given air pressure. For example, it has been found that a one inch by 1 mil film drafted in 140° C. steam at a draft ratio of 6.2:1 will be fractured into 110 ribbons at a pressure of 10 p.s.i.g. and speed of 20 feet per minute through the jet while at the same pressure, but at a speed of 300 feet per minute the film will be fractured only into 46 ribbons. Similarly, the same polypropylene film will be fractured into 115 ribbons at a pressure of 40 p.s.i.g. and speed of 20 feet per minute while at the same pressure and a speed of 300 feet per minute 100 ribbons will be produced.

The type and operation of the jets illustrated in FIGURES 3 and 4 have been thoroughly described and discussed in prior patents such as United States Patents Nos. 2,924,868 and 3,214,899. In general, a gaseous medium under pressures is introduced into a chamber surrounding the tube through which the film moves. As the film emerges from the tube the gas under high pressure impinges thereon and, because of the high degree of orientation of the film, causes it to fracture longitudinally. Where, as in the instant invention, the orientation of the film is carried to an extreme, the fracturing also results in the production of fibrils on the surfaces of the ribbons into which the film is fractured. While the jets such as those illustrated in FIGURES 3 and 4 are generally circular in cross section it is apparent that a slot venturi-type jet may be utilized to fracture oriented films. Other fracturing methods such as mechanical beating may be used, but the fluid type fracturing illustrated and described is preferred.

In general, the polymeric materials found to be useful in the present invention are those crystalline polymers susceptible to a high degree of molecular orientation, particularly olefinic polymers including crystalline (i.e., high density) polyethylenes, polypropylenes, and polyallomers. While the polyolefins, particularly polypropylene, are preferred other polymeric materials such as polystyrene, polyester, polyamide, and copolymers or mixtures of these materials may be used. It has also been found possible to fracture two films of different material such as polypropylene and polystyrene simultaneously in the same jet to produce a blend having desirable properties.

In general, the ribbons having fibrils extending outwardly from their surfaces according to the present invention are produced by drawing a polymeric film to increase its fracturability factor to greater than about 300. This has been found to be about the minimum figure at which fibrils will be produced during the fracturing operation. The drafted film is then fractured under conditions of air pressure and film speed through the jet to fracture the film into a plurality of ribbons each of which have a denier of about 5 to about 20 and each of the ribbons having less than about 10% by weight of hair-like, short outward, extending fibrils of less than about 5 microns in size. These ribbons may then be fed directly into a filter making process or, if desired, crimped, bloomed, or subjected to any of the processes well known in the filter manufacturing art.

While the above described means is preferred, the filter product according to the instant invention may be produced in a number of ways. For example, the film may be extruded and slit in one operation and oriented in a second operation. The third operation would then consist of fracturing the formed ribbons which would then be processed into filters. The second approach would be to extrude and wind the film full width. The full width roll of film would then be used as a supply for the orienting operation, in which case it would be slit into the desired width and a plurality of narrow widths of film would be fed through the drafting means. These drafted ends of film would then be wound on individual packages for transfer to a third operation wherein the individual ends would be passed through fluid fracturing jets and combined into a further product. In other cases, the extrusion drafting, fracturing, and filter formation may be carried out in a continuous operation.

As indicated above the fractured, coarse ribbons of our invention contain fine protrusions or hair-like fibrils extending transversely therefrom. It has been found that the protrusions constitute less than about 10% of the total filter structure by weight. It is believed that because of these fine fibrils, the filtration potential of the filters is as high as filters composed entirely of the fine denier filaments of the prior art.

While a substantial understanding of the invention is already apparent from the foregoing general description of the overall apparatus, process and product, a still further understanding will be had from a consideration of the following examples which are set forth to illustrate a number of the preferred embodiments of the invention.

EXAMPLE I

A one-mil thick by 1" wide film was melt extruded from polypropylene pellets and drawn in a hot oven. The film was drawn with a ratio of 6.2 to 1 in steam at 140° C. The film input speed was 20 feet/minute and the output speed was 124 feet/minute. The film as it left the output draw roll was treated with 35 p.s.i. air in a fracturing jet and was wound up on a bobbin with 2 turns per inch twist. One hundred twenty-five (125) ends of the film fractured into ribbons were combined and wrapped in cigarette filter. The filter was tested for tar removal efficiency according to the procedure given in Tobacco Science 4, 55–61 (1960) with the following results:

| | |
|---|---|
| Length of filter tip, mm. | 17 |
| Circumference, mm. | 25 |
| Weight of tip less paper, grams | 0.18 |
| Pressure drop (inches water) | 3.4 |
| Tar removal, percent | 50 |

By way of comparison, a cellulose acetate, 15-mm. long filter rod weighing 0.13 gram, made from 1.6 D/F tow of 37,000 total denier, had a pressure drop of 3.07 and a tar removal of 43.8%. In another comparison, a cellulose acetate filter rod 15-mm. long and weighing 0.165 gram was made from a 2.0 denier per filament (D/F) tow of 72,000 total denier and had a pressure drop of 2.4 and a tar removal efficiency of 35%. In a further comparison, a 5 denier per filament (D/F) 80,000 total denier cellulose acetate filter tip 15-mm. long which weighed 0.17 gram and having a hardness of 5.5 had a pressure drop of 1.2 inches of water and a tar removal efficiency of 17%.

The appearance of the film filter material was substantially as shown in FIGURE 7. The fractured ribbons averaged 6 denier/ribbon, and were 12 to 90 microns wide by 10 microns thick. As indicated in FIGURE 7 there were present, in an amount less than 10% by weight of the filter element, a number of fine hair-like protrusions each of which measured less than about 2 microns wide and thick.

Based on the comparison with the 5 denier per filament (D/F) acetate filter, it can be seen that the fractured film filter comprised of ribbons having fine hair-like protrusions on its surface was significantly more efficient in tar removal.

EXAMPLE II

A sample of drawn and jet-treated film was prepared as in Example I except that the film was drafted 6.4/1 with an input speed of 47 feet/min. and an output speed of 300 feet/min. The film was jet treated at 50 p.s.i. air pressure and wound up as zero-twist yarn. Ninety-five (95) ends of this yarn were beamed onto spools and used as the supply for a cigarette filter plug making machine.

Several hundred 90-mm. long x 24.9-mm. circumference cigarette filters were made. The filters were cut into 17-mm. lengths and tested for tar removal. The 17-mm. tips weighed 0.177 gram, each had a pressure drop of 2.8" water, and had a tar removal of 36%. No binder was applied to these rods. If desired a polyethylene powdered binder may be used.

An increase in filter hardness may be brought about by combining the jet-treated film with a small amount of tow of cellulose acetate plasticized, for example, with triacetin or the like.

EXAMPLE III

Thirty-four (34) ends of 1000-denier, jet-treated fractured polymeric film were combined with a 33,000 denier cellulose acetate tow made up of 5 denier per filament (D/F) substantially oval filaments. Triacetin plasticizer (7.1% by weight based on the total rod weight) was applied. Rods 102-mm. long x 24.8-mm. circumference were made which weighed 1.02 grams. These rods had a hardness of 6.4 and a pressure drop of 9.4" of water. When cut into 17-mm. tips and tested for tar removal, these tips weighed 0.17 gram, had a 2.07" water pressure drop, and 25% tar removal. As can be seen in comparison with the data given previously for a 5 denier per filament (D/F) 100% acetate filter tip, the tar removal for the rod of Example II was considerably higher.

The fractured film used to prepare filters as in preceding Examples I and II was prepared substantially by the process indicated in the flow chart described hereinabove. According to this procedure the drawn film was prepared by extruding, e.g., a 1-mil polypropylene film about 90 inches wide, and drafting it to a 6.4/1 ratio before winding it up on a mandrel. Or, if desired, a 5-mil thick x 35-inch wide film may be similarly extruded and drawn at a 12 or 13 to 1 ratio. In either case, the roll of drawn film is mounted so as to unroll freely as the film is pulled by feed rolls. From the feed rolls the film is then fed to a treating jet. In the jet the film is coarsely shredded or fractured into ribbons about 5 to 20 denier each in size, and tiny hair-like short extensions of less than 5-microns size are torn loose at one end from the coarse filaments but remains attached at the other end as shown in FIG- URES 6 and 7. The treated film then passes over delivery rolls into the garniture of a cigarette filter plug making machine.

If desired, the drawn, jet-treated film may be puddled into a baler, with or without imparting crimps to the mass of flat ribbons, and then compressed and wrapped. The baled material may be converted into filter plugs by merely pulling it from the bale with feed rolls, fluffing it in an air jet, and passing it to the delivery rolls and garniture of the filter plug maker.

It may be desired to place various addenda on the jet-treated, fractured film. For example, activated charcoal may be added to provide high removals of the gaseous phase components of cigarette smoke, such as acrolein, isoprene, and others. In such instance the jet-treated film may be fed to a slurry applicator where a mixture of water, binder and activated charcoal is applied to the treated film. The fractured film containing additive then passes through a drying oven where the water is evaporated and the binder activated and cured. The binder holds the activated charcoal on the treated film so that it may be then fed by the delivery rolls into the garniture of the filter plug maker with minimum loss of addendum.

EXAMPLE IV

A bale of 50,000 total denier, jet-treated, stuffer box crimped black film, having an average denier per ribbon of about 30 was used as supply source. The ribbons were coated with a slurry of activated charcoal of 325 mesh or finer, a binder (methyl cellulose) and water. The binder was cured and the water evaporated in an oven, and the coated treated film was fed to a cigarette plug maker in which filter rods were prepared.

EXAMPLE V

A 35,000 denier jet-fractured, crimped ribbon film having 15 crimps per inch was produced by continuously extruding polypropylene into a film longitudinally orienting said film with a draw/neck length ratio 5:1, a fracturability factor of over 3000 and a fracturability angle of less than 1°, jet fracturing the oriented film to the extent of about 10 to 20% of its potential fracturability and then crimping to 15 crimps per inch in a stuffer box type crimper and packaging in a bale. The bale of crimped fractured film material was then fed to a tobacco smoke filter forming machine wherein about 10% by weight of a low melting point polyethylene binder powder of about 50 mesh was dusted onto the spread-out fractured film. Heat was applied to activate the binder powder and the film and binder were shaped into a tobacco smoke filter rod having a pressure drop of about 5" of water for a 90-mm. length rod of 24.8-mm. circumference and a tar removal efficiency of about 10%. The filter rods had acceptable firmness or hardness due to the bonding action of the polyethylene binder powder.

In forming cigarette filters from our material, the degree of potential fracturing desired depends upon the degree of tar removal efficiency which we wish to achieve. Thus, if a high tar removal filter, say 40 to 50% is desired, 80 to 95% of the potential fracturability should be carried out in the jet treatment. However, if low tar removal is desired, say 20%, then only about 50% or less of the potential fracturability is carried out in the jet treatment stage of the process. Actually if desired tar removal of as low as 10% may be attained by effecting only 5 to 20% of the potential fracturability of the film in the jet treatment. Since the percent of potential fracturability attained is largely a function of jet fluid pressure, it will be readily apparent that the process of FIGURE 2 represents a tremendous advance over the prior art spinnerette produced filamentary smoke filters. In our process it is usually only necessary to raise or lower the jet pressure to raise or lower the tar removal properties of the filter. In the prior art if a given spinnerette spun tow could not produce the desired tar removal, it was necessary to discard that tow and manufacture new spinnerettes to produce a finer or coarser denier per filamentary tow at great expense and loss of production time.

EXAMPLE VI

As indicated above, the fracture process of the present invention has a wide range of application in the cigarette filter areas. For example, 1-mil thick by 1" wide film disintegrated at 40 p.s.i. air pressure and 20 feet per minute film speed through the jet produces a highly dispersed fractured film which is wound up with little or no twist. Such a product has an average denier per fractured ribbon in the order of about 5 to 6.

The fractured ribbons being rectangular in cross section have a very large surface area as compared to a round filament of the same size in denier. Since in many filtration applications a large surface area is conducive to good filtration, it will be apparent that the flat fractured ribbon of the present invention has many uses for filtration fabrics or packs.

Several ends of the flat fractured ribbon were combined together and processed into a cigarette filter rod. It was found that good removal rates are obtained due to the large surface area of the flat fractured ribbons. In examining the fractured ribbons under a microscope it was noted that the hair-like, short, fine extensions protruding from the large coarse ribbons have a width of about 2 to 5 microns, and appear as tiny hairs protruding from the relatively large, coarse ribbons of 12 to 90 micron width. It is thought that these tiny protrusions attached to the coarse ribbons greatly assist in obtaining higher removal rates in tobacco smoke filters.

A filter rod having the following characteristics was prepared by plying together 96 ends of the fractured ribbon product and pulling them through a filter rod-making machine:

| | |
|---|---:|
| Estimated denier, den./fil. | 6 |
| Estimated total denier | 105,000 |
| Length of filter tip, mm. | 17 |
| Circumference of filter tip, mm. | 25 |
| Weight of filter tip without paper (av. of 20), g. | 0.18 |
| Amount tars removed by filter tip, percent | 50 |
| Pressure drop of filter tip (av. of 20 tips), inches | 3.4 |

The amount of tar removed at this pressure drop is useful. It approaches the efficiency of 1.6 D/F crimped acetate tow which can remove up to 50% tar at a pressure drop of 3 inches. A heavy paper wrap obtains the desired rod stiffness.

While in the foregoing discussion the process has been described principally in relation to polypropylene film, a number of other materials may also be used in the process.

EXAMPLE VII

A 1"-wide by 3-mil thick polyallomer film was drafted 5.8:1 in 350° F. air, heat set at 300° F. in air and passed through the air jet feed of FIGURE 4 with 60 pounds per square inch air. A flat, fractured-ribbon yarn was produced.

EXAMPLE VIII

A polyester film 1¼" wide by 1-mil thick was drafted in hot air at 250° F., at a draft ratio of 5.1 to 1, and heat set at 450° in air. The drafted polyester film was then fed through an air jet using 60 pounds air pressure. The resultant product was a staple-like, fractured-film material. It was observed that under equal conditions, the polyester film produced a more staple-like material than is obtained with polypropylene film. That is, there were fewer interconnections between the fine fractured ribbons in a polyester material than in a fractured polypropylene material.

From the foregoing two examples, it will be apparent that any of these materials could be blended with polypropylene or with each other by feeding the two different films through the jet in the desired proportions. Further, the flat, fractured ribbons described herein may be textured, if desired, by several of the known means of texturing conventional continuous filament or staple fiber yarns. For example, if desired, prior to twisting the fractured film may be subjected to a stuffer-box crimping texturing. The highest degree of orientation, as preferred in our process described above, is in direct relation to the orientation temperature, the oven hold-up time, and the width and thickness of the unoriented film. Assuming a constant film width of 1 inch and a variation in film thickness from ½ to 5 mils, the maximum draft ratio is seen to vary from about 3:1 for the ½ mil to about 15:1 for the 5 mil using an optimum combination of hold-up time and temperature. However, the ratios reached with hot air ovens do not necessarily represent the absolute maximum attainable, since some increase may be effected with another type of orientation heat such as steam. The range from 3:1 to 15:1 is considered to contain the preferred drafting ratios for polypropylene film as used above.

When less than the maximum drafting ratio is used, all other conditions remaining constant, it becomes apparent that the degree of fracture and separation effected in the fluid jet is reduced, and the resulting fractured ribbons are thicker and wider.

The take-up rate or production speed is not limited to any particular value. The hold-up time is directly proportional to the take-up rate; but for any given rate, the length and temperature of the oven can be designed to produce the necessary film temperature. In the various examples, take-up rates ranging from 300 ft./min. to 600 ft./min. were successfully used without indication of reaching a limit in either direction. The upper limits in production would be determined by the maximum speed at which the equipment operators could handle the materials in hook-up and doffing operations.

The air or steam pressures used in the fluid jet are in many instances also in direct relation to the thickness of the film. An unoriented 5-mil film may be drafted and processed into flat fractured ribbons with a 90 p.s.i. jet pressure, but the jet pressure used in this instance will be higher than for a 1-mil film, assuming the same degree of fracture is effected in both thicknesses. The pressure ranges used in various runs have varied from 5 to 90 p.s.i. with maximum unoriented film thickness of 5 mils. It is possible that higher jet pressures would be desirable for even thicker films (6–10 mils) to produce the desired amounts of fracture.

We claim:
1. A filter comprising:
  (a) a mass of relatively coarse, flat, filamentary-like ribbons discontinuously and randomly separated from each other yet interconnected with said mass, said ribbons being fractured from a highly molecularly oriented polymeric film;
  (b) said flat filamentary-like ribbons as a whole being in substantial alignment longitudinally of said mass;
  (c) each coarse, flat, filamentary-like ribbon having hair-like protrusions integrally formed and of the same film material on said ribbon extending outwardly and multidirectionally therefrom along the length thereof.
2. A filter according to claim 1 wherein said hair-like protrusions extending outwardly from said ribbons comprise about 10% by weight of said ribbon.
3. A filter according to claim 2 wherein said hair-like protrusions have a width of from about 2 to about 5 microns.
4. A filter according to claim 3 wherein said ribbons range in denier from about 5 to about 20.
5. A filter according to claim 4 wherein the average denier of said ribbons is about 6 and the width thereof is from about 12 microns to about 90 microns.
6. A filter according to claim 5 wherein said film material is polypropylene.
7. A filter according to claim 5 wherein said mass is tightly compacted into a cylindrical form adapted to be secured to the end of a cigarette.
8. A filter according to claim 5 wherein said ribbons intersect at random points forming intersections and are bound together at said intersections by a binder.
9. A filter according to claim 8 wherein said binder is polyethylene.
10. A filter according to claim 1 wherein said mass is tightly compacted into a cylindrical form adapted to be secured to the end of a cigarette.

References Cited

UNITED STATES PATENTS

| | | | |
|---|---|---|---|
| 2,774,680 | 12/1956 | Hackney et al. | 55—524 X |
| 2,931,748 | 4/1960 | Muller | 55—522 X |
| 3,039,908 | 6/1962 | Parmele | 210—508 X |

HARRY B. THORNTON, *Primary Examiner.*

B. NOZICK, *Assistant Examiner.*

U.S. Cl. X.R.

210—508